Aug. 9, 1932.  N. L. MERCUR  1,871,071
ELECTRORESPONSIVE VALVE MECHANISM
Filed Aug. 7, 1931 2 Sheets-Sheet 2
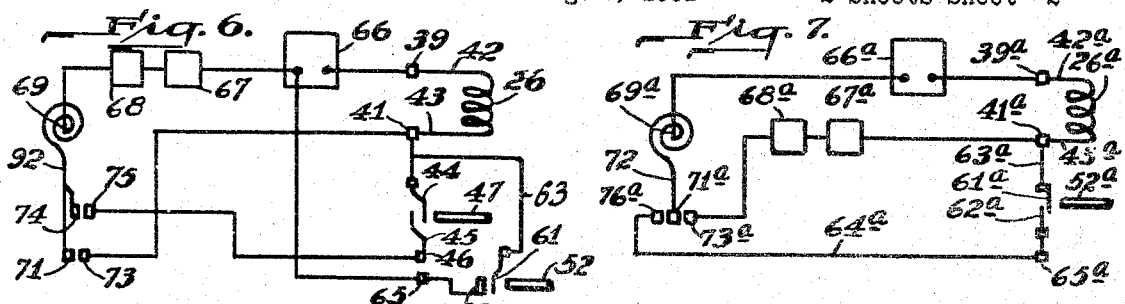
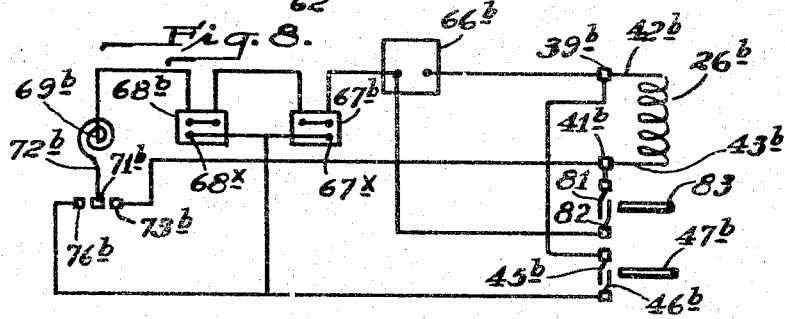
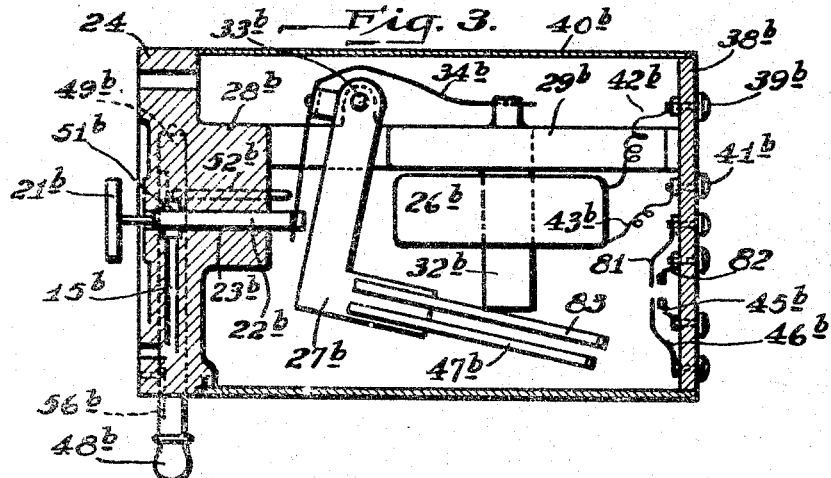
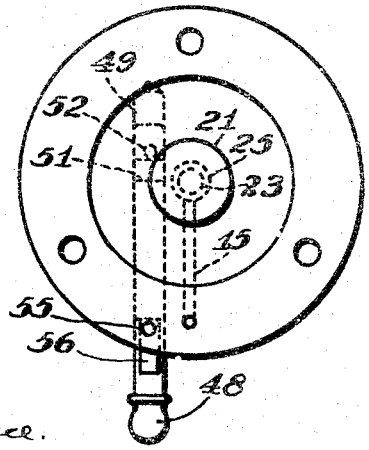
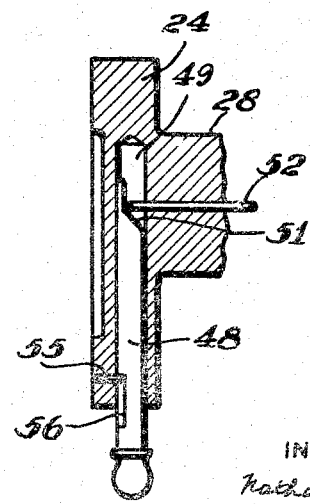
WITNESS
INVENTOR Patented Aug. 9, 1932

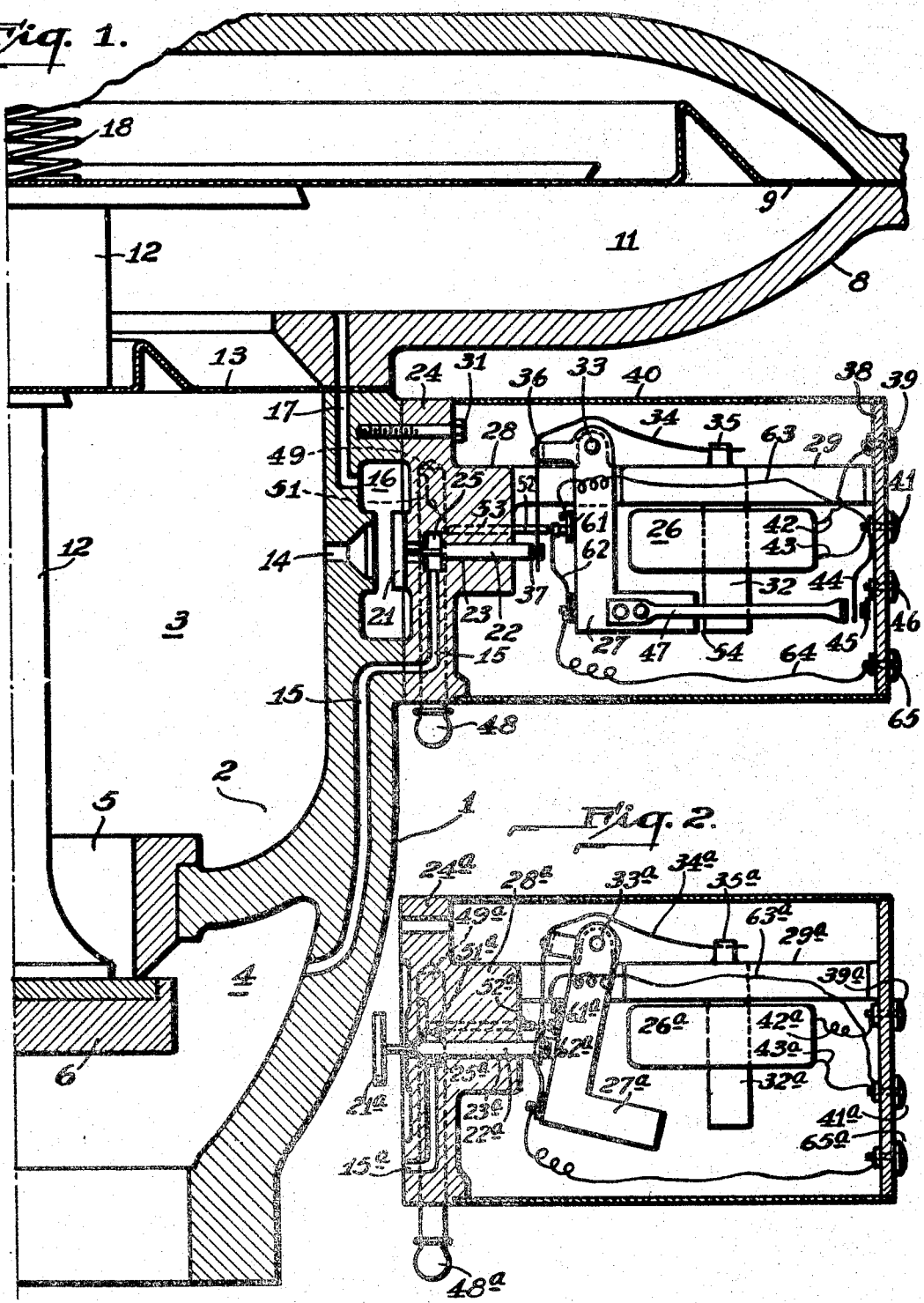

1,871,071

UNITED STATES PATENT OFFICE

NATHAN L. MERCUR, OF McKEESPORT, PENNSYLVANIA

ELECTRORESPONSIVE VALVE MECHANISM

Application filed August 7, 1931. Serial No. 555,768.

This invention relates generally to a valve mechanism and particularly to an electrically operable valve which while not necessarily so limited is adapted more especially for controlling the flow of combustion fuel to a gas furnace or the like from remote points.

In modern heating systems automatically operated control systems are employed to a large extent for regulating the flow of fuel supplied to the furnace burners. These control systems are generally of a temperature responsive type employing thermostatic switches, customarily referred to as room thermostats and located in parts of a building where it is desired to control the heat, for governing the operation of electro-responsive fuel controlling means located in the fuel feed lines leading to the furnace. Where gases and other fluids constitute the combustion fuel employed, electrically operated pilot valves are usually employed to control the operation of the main fuel regulating valves, and these are connected for operation under the control of the room thermostats.

In accordance with the customary practice the pilot valves are generally designed to cause fuel to be supplied to the furnace when current is flowing in the control circuit connected to them and to shut it off when the circuit is deenergized. The room thermostats in turn are adapted to maintain such circuits closed until the heat in the room in which they are located reaches a desired temperature and to open them when such temperature is exceeded. Consequently when the thermostats are open the fuel supply is shut off and when closed it is turned on. To provide for operating the furnace in case of a failure for any reason in the control circuit, as may not infrequently happen, or in case the control circuit is not connected, manual means is usually provided for opening and closing the pilot valves or otherwise manually controlling the furnace. These manually operable devices in the more improved systems are adapted to come under the control of the thermostats when the control circuit is established. However, in most of the present systems, if the fuel supply is turned on by the manual means while the thermostat is open, it is impossible for the automatic control to operate at least not until the fuel is turned off manually and the thermostat cooled sufficiently to close the control circuit, as otherwise the added heat maintains the thermostat open indefinitely. Such a condition may occur if the furnace is started manually before the control circuit is connected and the thermostat heated to its circuit opening position before the control is set in operation, or if it is started manually, when a failure occurs in the control circuit and the cause of the failure is not repaired until after the room thermostat is opened. Where the user depends on the reliability of the automatic control such a fault may result in considerable inconvenience and trouble, as well as possible injury to the heating apparatus.

To eliminate the possibility of such difficulties and insure automatic control at all times when current is supplied to the control circuit, it is the primary object of this invention generally stated to provide an improved electro-responsive pilot valve mechanism and manual control therefor which is adapted to permit its being operated manually when the control circuit in which it is connected is deenergized and to automatically transfer its control to such circuit when the latter is energized, and this independently of the position of the switching mechanism operated by the thermostat at the time the current is supplied to the circuit.

A further object is to provide an improved control system and valve mechanism of the above-noted character which is of simple and sturdy construction, dependable in operation and susceptible of being manufactured at a comparatively low cost.

These and other objects, as well as the various other novel features and advantages of the invention, will be apparent when the following detailed description is read in conjunction with the accompanying drawings, of which Fig. 1 is a sectional view of one embodiment showing it as applied to a combined regulating and shut-off valve of the type illustrated and described in U. S. Patent No. 1,764,790, granted to C. H. Hook and N. L. Mercur June 17, 1930; Fig. 2 a similar view of a modified form of the invention; Fig. 3 a view similar to Fig. 2 of another modification of the invention; Figs. 4 and 5 front and sectional views, respectively, of the valve body of the structures shown in both Figs. 1, 2 and 3; Fig. 6 a control circuit including the structure shown in Fig. 1; Fig. 7 a control circuit including the structure shown in Fig. 2; and Fig. 8 a control circuit including the structure shown in Fig. 3.

Referring now to the drawings and particularly to Fig. 1 the embodiment of the invention illustrated therein is shown as applied to a combined regulating and shut-off valve mechanism of the type referred to above which comprises essentially a valve casing 1 that is divided by a partition 2 into an inlet chamber 3 and an outlet chamber 4. In partition 2 there is provided a valve opening 5 and in it a valve 6 is arranged to seat. Above casing 1 is another two-part casing 8 which is divided by a flexible diaphragm 9 which forms with the lower part of casing 8 a pressure chamber 11. To this diaphragm a valve stem 12, carrying valve 6, is attached, the stem being extended in a seal tight fashion through a second diaphragm 13 positioned between casings 8 and 1. For operating valve 6 ducts 14 and 15 are extended from chambers 3 and 4 into a valve chamber 16 and a common duct 17 is extended from there into pressure chamber 11 so that diaphragm 9 can be rendered responsive to the pressure in either the inlet chamber 3 or the outlet chamber 4 of casing 1, said diaphragm being so dimensioned that it will positively close valve 6 when chamber 3 is connected to chamber 11 and will cause it to function as a regulating valve when chamber 4 is connected thereto. To vary the operation of valve 6 as a regulating valve an adjustable spring 18 is arranged to bear on diaphragm 9.

In accordance with this invention a valve 21 is provided for controlling the connection between chambers 3 and 4 and chamber 11. This valve is supported on a valve stem 22 which is in turn supported in an opening 23 in a valve body 24. In the adaptation shown, body 24 forms one wall of chamber 16 and through it duct 15 is extended, the duct terminating in an enlargement 25 of opening 23 near the valve chamber end thereof whereby valve 21 in its outer position closes the end of the duct. Duct 14 is connected to valve chamber 16 at a point concentric with opening 23 in body 24 so that it is closed when valve 21 is moved to its innermost position. Hence pressure chamber 11 is connected to inlet chamber 3 and outlet chamber 4 is shut off when valve 21 is moved to cover the end of duct 14 and vice versa when the valve is moved to cover the end of opening 23. Accordingly, through the operation of pilot valve 21, when valve 6 is connected to control the flow of fuel to a furnace, the latter can be made to either shut off the furnace or regulate the fuel flow.

To provide for operating valve 21 by remote control an electro-magnet, consisting of a solenoid 26 and a movable armature 27, is provided. For supporting these parts a pair of plates 29 are attached in any suitable fashion to a projection 28 of body 24, the body itself being detachably secured to casing 1 of the main valve mechanism by bolts 31. As a magnetic circuit for solenoid 26 an L-shaped core 32, preferably of laminated permeable material, is secured between plates 29. One leg of this member projects below the plates and solenoid 26 is mounted upon it. The remainder of the magnetic circuit is completed by armature 27 which like core 32 is L-shaped in form and pivotally attached at 33 between plates 29.

With this construction, when mounted in the manner shown, armature 27 is normally urged by gravity away from core 32 at its lower end. However, it is also urged in such a direction by a spring member 34, which consists of a piece of strip steel attached at one end to a lug 35 on plates 29 and at 36 to armature 27, the attachment being such as to urge the armature in the direction stated. From 36 strip 34 is extended along the back of the armature with its lower end slotted and engaged in an annular groove 37 formed in the end of stem 22, the latter being adapted to be engaged by the spring so as to render it movable from one operating position to another by armature 27. Accordingly, when armature 27 is in the position shown in Figure 1 valve 21 is held over the end of duct 15 and when it is in the position shown in Fig. 2 the valve is moved over the end of duct 14.

On the end of plates 29 an end cover 38, which is preferably made of electrical insulating material, is attached and upon this a pair of terminals 39 and 41 are secured for connecting solenoid 26 in a control circuit, the leads 42 and 43 respectively of the solenoid being connected to these terminals. Over the whole pilot valve structure a tubular housing 40 is secured to protect it against injury.

In order to avoid chattering of valve 21, which may be occasioned by a thermostat connected in circuit relation with solenoid 26 vibrating on its support as they frequently do, a holding circuit connection is provided in the structure. This consists of a switch formed by a pair of resiliently mounted contact members 44 and 45 which are connected to binding post 41 and another binding post 46 respectively, the latter binding post being employed to complete the holding circuit through a thermostat as will presently appear. Normally, contact members 44 and 45 are adapted to be separated, and for closing them when solenoid 26 is energized, an arm 47 is secured to armature 27 to engage contact member 44 and press it against contact member 45 when armature 27 is pulled tightly against core 32.

For manually operating valve 21 a bolt 48 is fitted loosely in a vertically disposed bore 49 formed in valve body 24 at the side of opening 23, see Fig. 4. This bolt is tapered at 51 adjacent its upper end to engage and move a pin 52 which is arranged for horizontal movement in a bore 53 communicating with bore 49 and extending through the back of projection 28. Pin 52 is made sufficiently long to force armature 27 to the position shown in Fig. 1, closing valve 21 and duct 15 when bolt 48 is moved its full distance upward. In such position the end of the pin engages the side of the bolt and through the pressure applied on it by spring 34 and the weight of armature 27 it holds the bolt from falling which it normally does, however, due to gravity, when such pressure is released. Consequently for manual operation all that is necessary to close duct 15 and open duct 14 and thereby cause valve 6 to open is to push bolt 48 upward. While the pressure on pin 52 as stated normally holds the bolt in such position when the solenoid is deenergized it may be manually moved to its lower position as desired.

To provide for releasing bolt 48 automatically if it is in its raised position when solenoid 26 is energized pin 52 is so made that it allows a gap 54 between armature 27 and core 32 when the armature is moved to its valve closing position by the bolt. Hence when the solenoid is energized and the armature moved tightly against the core, closing such gap, the pressure on pin 52 is released and the bolt allowed to fall due to gravity to its lower or inactive position. A set screw 55 is screwed in bore 49 to engage a slot 56 in the side of the bolt to prevent the bolt from falling from the bore when the pin is released. Spring 34, being flexible, permits the movement of armature 27 sufficiently to close the gap 54 after valve 21 is seated without injury to the valve.

An important feature of the invention resides in the provision of a switch mounted on armature 27 which consists of contact members 61 and 62 connected by leads 63 and 64 respectively with terminal 41 and a fourth terminal 65 on end cover 38. These contacts are preferably mounted on but insulated from the armature and adapted to normally remain open. As shown they are normally apart but so arranged that when pin 52 is moved to force armature 27 to its valve closing position shown in Figs. 1 and 3, they are closed by the pin. Thus an additional energizing circuit through terminal 65 is provided for solenoid 26, the operation and advantage of which when included in a control circuit appears more clearly hereinafter.

Referring now to Fig. 6 a control system adapted in accordance with the invention for the valve structure illustrated in Fig. 1 is shown as comprising principally the valve mechanism itself, a source of current supply, for example, transformer 66, a pair of safety switches 67 and 68 and a thermostatic switch 69. In this system the normal control circuit for solenoid 26 is traced from terminal 39 through transformer 66, safety switches 67 and 68, thermostat 69 and back to terminal 39 by way of terminal 41 and the solenoid. For completing and controlling such circuit a thermostat of any suitable type may be used but as shown here a bimetallic type is provided which is equipped with a contact member 71 on its free arm 72. This is adapted to be moved into engagement with a fixed contact member 73 associated therewith, to complete a circuit through the system when the thermostat is cooled sufficiently to move arm 72 to make such contact.

To avoid chattering of valve 21, should the thermostat be vibrated when it is completing or breaking the circuit through solenoid 26, an auxiliary contact 74 is provided on arm 72 to contact with a second fixed contact 75. This latter contact is connected to a terminal 46, and is designed to engage its associated member 75 before contact member 71 engages member 73 when the thermostat cools off and to break its engagement therewith as the thermostat is heated up, after contact member 71 leaves contact member 73. By reason of contact members 44 and 45 being open until solenoid 26 is energized, no circuit is completed through the solenoid due to the movement of arm 72 until after contact is made by contact member 71 with fixed contact member 73. Inversely after contacts 44 and 45 are closed by arm 47 with the closing of armature 27 the solenoid circuit is not broken until contact member 74 disengages fixed contact member 75 as the thermostat heats up. Hence by properly adjusting the two sets of contacts such a marginal difference in temperatures may be required to open and close the contacts as to insure against vibration of the thermostat opening the solenoid circuit and thereby avoid the undesirable chattering referred to.

To insure the pilot valve being at all times under the influence of the control circuit when such circuit is operating, a circuit shunting thermostatic switch 69 is provided which extends from one side of transformer 66 through terminal 65 to contact member 62 and from there by way of contact 61 through conductor 63, terminal 41, solenoid 26 and terminal 39 to the other side of the transformer. By reason of such provision if valve 21 is closed by bolt 48 when the thermostat is heated sufficiently to open the normal control circuit or the furnace is started manually when the control circuit is not connected for operation and the thermostat is heated above its normal circuit opening position when the circuit is put in operation, the above circuit will be completed through solenoid 26 by way of the switch contacts 61 and 62 on the back of armature 27 which are held closed under such conditions by pin 52. When completed it moves the armature to close gap 54. This releases the pressure applied to bolt 48 by pin 52 and the bolt is allowed to fall to its inactive position. When such occurs contact members 61 and 62 and the armature assume their normal open position breaking the solenoid circuit. Thereafter the energization of the solenoid is completely under the control of the thermostat.

Switches 67 and 68, shown in the drawings, represent the usual or well known types of pressure and thermostatic switches commonly employed to shut down a furnace in case the boiler pressure exceeds a safe value or the gas supply fails, the first being placed to respond to the boiler pressure and the second to be opened in case the fuel supply fails and both are so included in the circuit shown as to open the circuit and maintain it open so long as such conditions maintain.

Referring to Fig. 2 the embodiment of the invention illustrated therein differs from that shown in Fig. 1 principally only in that the chatter eliminating mechanism is omitted from the structure. To simplify the description, the various parts of this embodiment are designated by the same numeral used in connection with the structure shown in Fig. 1, except that the small letter a is attached to each to distinguish the two. While this form of the invention like the former may be used with any type of room thermostat it is more particularly adapted for use with thermostats in which a snap action type of switch is employed. In such thermostats chattering of the apparatus controlled by them is usually avoided by reason of the fact that it takes several degrees of temperature change to effect operation of the switch from one position to another and this is usually sufficient to prevent such vibrations as the devices usually encounter disturbing their operation.

A control circuit for this latter form of construction according with the invention is shown in Fig. 7. In it the main circuit for controlling solenoid 26a is traced from one side of transformer 66a to terminal 39a thence through solenoid 26a, terminal 41a, protective switches 67a and 68a and from there by way of contacts 73a and 71a on room thermostat switch 69a back to the other side of the transformer. In addition to this main circuit there is an auxiliary circuit extending from terminal 41a through contacts 61a and 62a located on the back of armature 27a and actuated by the pin 52a, thence through terminal 65a to contacts 76a on the room thermostat 69a which are adapted to be engaged by contact 71a when the thermostat is heated above a predetermined temperature at which it is desired to maintain the room controlled by it. This latter circuit insures the operation of valve 21a in a manner to close the main flow valve 6 in case the pilot valve is adjusted for manual operation by the bolt 48a being elevated to its open position when the control circuit is deenergized and then the current applied after the room thermostat is heated above its main valve-closing position or the protective switches 67a or 68a are opened by reason of the boiler being overheated or the burners being extinguished. In such a circuit if armature 27a is raised manually and contact 71a engages contact 76a with the circuit energized solenoid 26a is also energized by reason of contacts 61a and 62a being closed, and due thereto armature 27a is moved forward as previously described sufficiently to release pin 52a. When this occurs, contacts 61a and 62a are opened and the solenoid deenergized. Thereafter the control of valve 21a reverts to the main control circuit traced above.

Referring to the embodiment of the invention illustrated in Fig. 3, the mechanical structure shown therein differs from that shown in Fig. 1 only in that the contacts 61 and 62 are omitted and a pair of contacts 81 and 82 substituted in their place, the latter being arranged adjacent to contacts 45b and 46b and an arm 83 is provided on armature 27b adjacent arm 47b for operating them. This arm, however, is adapted to close the contacts 81 and 82 when the armature 27b is moved by bolt 48b to control valve 21b manually.

For use with this form of the invention a control system such as shown in Fig. 8 may be employed. In it a main and two auxiliary circuits are provided to control solenoid 26b. The main of these which constitutes the circuit adapted to normally control the operation of valve 21b is traced from one side of transformer 66b, through terminal 39b, solenoid 26b, terminal 41b, contacts 73b and 71b, on thermostat switch 69b and the protective switches 67b and 68b back to the other side of the transformer. For insuring solenoid 26b coming into service when current is applied to the circuit after valve 21b is operated manually by raising bolt 48b, contacts 81 and 82 of the arm 83 are connected in a circuit which is traced through such contacts from one side of transformer 66b through terminal 39b, solenoid 26b, contacts 81 and 82 and thence to the other side of the transformer. Hence when armature 27b is raised by bolt 48b the solenoid is connected directly across the transformer and due thereto armature 27b is urged to its magnetically closed position as soon as current is supplied to the circuit. With the closing of the gap between the armature 27b and the core of the solenoid, contacts 45b and 46b are closed by arm 47b. These latter contacts are connected in a circuit extending from one side of transformer 66b through themselves to a contact 76b arranged to be engaged by contact 71b on the room thermostat switch 69b when that switch is heated to a predetermined temperature. Contact 46b is also connected by a conductor 84 with back contacts 67x and 68x provided on the protective switches 67b and 68b. These back contacts are so arranged that when the switches 67b and 68b are actuated to open the circuit between the transformer 66b and the thermostat switch 69b they close the circuit extending from conductor 84 through contacts 46b and 47b to the other side of the transformer 66b. Consequently if transformer 66b is energized at a time when the bolt 48b is raised and either of the protective switches 67b or 68b is operated to cause the main gas flow valves to be closed so as to protect the furnace with which they are used when such occurs, a circuit is provided from one side of transformer 66b through the contacts 45b and 46b by way of conductor 84 through whichever one or both of the switches 67b or 68b is opened to the other side of the transformer. This circuit when established will cause the solenoid 26b to be short-circuited and hence cause armature 27b to fall open and open switches 81 and 82. It will be appreciated that the opening of either or both of the switches 67b and 68b will prevent the operation of the above-traced main control circuit until such switches are closed. A further protection is provided by such system in that in case the thermostat switch 69b is heated sufficiently for contact 71b to engage contact 76b when the current is applied to the transformer 66b after the armature is closed by bolt 48b a shunt circuit is provided for solenoid 26b which extends from one side of the transformer 66b through the contacts 45b and 46b which are closed with the energization of solenoid 26b thence through contacts 76b and 71b of switch 69b and the protective switches 68b and 67b to the other side of the transformer. This circuit like the one just previously traced when established will cause solenoid 26b to be short-circuited and thereby cause armature 27b to fall open. In falling open both contacts 81 and 82 and 45b and 46b are opened and hence the solenoid can not be again energized until either the switch 69b is cooled sufficiently for contact 71b to engage contact 72b or else the armature is closed manually.

Among the outstanding advantages of the invention is the novel provision made for insuring the pilot valve being always placed under automatic control when its actuating solenoid is energized or the circuit containing it is energized.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. A valve mechanism comprising a valve, an armature operably coupled to said valve for moving it from one position to another, a solenoid for moving said armature in one direction, means normally urging said armature away from said solenoid, manually operable means for also moving said armature and releasably holding it in a selected position when said solenoid is deenergized, said manual means being so constructed as to be automatically released and rendered inactive when said armature is acted upon by said solenoid, and a normally open switch for establishing a circuit through said solenoid arranged to be closed by said manually operable means when the latter is made to engage said armature.

2. A valve mechanism comprising a valve, an armature operably coupled to said valve, a solenoid arranged to move said armature from one position to another, a spring mounted to constantly urge said armature away from said solenoid, manually operable means for moving said armature and releasably holding it in a selected position, and a normally opened switch for establishing a circuit through said solenoid arranged to be closed by said manually operable means when it is moved into engagement with the armature.

3. A valve mechanism comprising a valve, an armature yieldably coupled to said valve, a solenoid for moving said armature from one position to another, manually operable means for moving said armature in the same direction as said solenoid moves it and holding it in a preselected position, said solenoid being adapted to move said armature to release said manually operable means when energized, and a normally opened switch for completing a circuit through said solenoid arranged to be closed by said manually operable means when moved to engage said armature.

4. In combination, a valve, an armature operably coupled to said valve, a solenoid for moving said armature from one position to another, a source of current supply for said solenoid, a thermostatic switch connected in said circuit for controlling the operation of said valve, manually operable means for operating said valve when said solenoid is deenergized, said means being adapted to releasably hold said armature in a selected position and to automatically release itself when the solenoid is energized and a switch connected across said thermostatic switch and arranged to be operated by said manually operable means when moved to engage said armature.

5. In combination with a valve for controlling the flow of fuel to a gas fired furnace, an armature for moving said valve from one position to another, a solenoid for operating said armature, a source of current supply for operating said solenoid, a circuit including a thermostatic switch for automatically controlling the operation of the solenoid, manually operable means for moving said armature from one position to another, and a switch connected in said circuit in shunt circuit relation with said thermostatic switch and arranged to be closed when said manually operable means is moved to engage said armature.

6. A valve for controlling the flow of fuel to a gas fired furnace, electro-responsive means for operating said valve, a circuit including a source of current supply and a thermostatic switch connected to control the operation of said electro-responsive means, manually operable means arranged to operate said valve when said circuit is deenergized and to be automatically rendered inactive when the circuit is energized, and a switch arranged to be operated by said manually operable means and to shunt said thermostatic switch when said valve is moved by the manually operable means.

7. A valve for controlling the flow of fuel to a gas fired furnace, electro-responsive means for operating said valve, a circuit including a source of current supply and a thermostatic switch connected to control the operation of said electro-responsive means, manually operable means arranged to operate said valve when said circuit is deenergized and to be automatically rendered inactive when the circuit is energized, a switch arranged to be operated by said manually operable means and to shunt said thermostatic switch when said valve is moved by the manually operable means, and a second switch arranged to be closed by said electro-responsive means when energized and to cooperate with said thermostatic switch when the latter is heated above a predetermined temperature to deenergize said electro-responsive means.

In testimony whereof, I sign my name.

NATHAN L. MERCUR.

DISCLAIMER 1,871,071.—*Nathan L. Mercur*, McKeesport, Pa. ELECTRORESPONSIVE VALVE MECHANISM. Patent dated August 9, 1932. Disclaimer filed July 8, 1935, by the assignee, *Minneapolis-Honeywell Regulator Company*.

Hereby enters this disclaimer to claim 6 of the said patent which is in the following words, to wit:

"6. A valve for controlling the flow of fuel to a gas-fired furnace, electro-responsive means for operating said valve, a circuit including a source of current supply and a thermostatic switch connected to control the operation of said electro-responsive means, manually operable means arranged to operate said valve when said circuit is deenergized and to be automatically rendered inactive when the circuit is energized, and a switch arranged to be operated by said manually operable means and to shunt said thermostatic switch when said valve is moved by the manually operable means."

[*Official Gazette July 30, 1935.*]